(12) United States Patent
Herrmann et al.

(10) Patent No.: US 11,337,548 B2
(45) Date of Patent: May 24, 2022

(54) PRESSURE SENSOR OVERFLOW INTERLOCK SYSTEM FOR BEVERAGE MAKER

(71) Applicant: B/E Aerospace, Inc., Winston-Salem, NC (US)

(72) Inventors: Justin D. Herrmann, Lenexa, KS (US); John H. Beard, Olathe, KS (US)

(73) Assignee: B/E Aerospace, Inc., Winston-Salem, NC (US)

( * ) Notice: Subject to any disclaimer, the term of this patent is extended or adjusted under 35 U.S.C. 154(b) by 205 days.

(21) Appl. No.: 16/784,979

(22) Filed: Feb. 7, 2020

(65) Prior Publication Data

US 2020/0383519 A1    Dec. 10, 2020

Related U.S. Application Data

(63) Continuation-in-part of application No. 16/433,207, filed on Jun. 6, 2019.

(51) Int. Cl.
*A47J 31/52* (2006.01)
*A47J 31/46* (2006.01)

(52) U.S. Cl.
CPC ......... *A47J 31/5251* (2018.08); *A47J 31/461* (2018.08); *A47J 2203/00* (2013.01)

(58) Field of Classification Search
CPC ... A47J 31/5251; A47J 31/461; A47J 2203/00
(Continued)

(56) References Cited

U.S. PATENT DOCUMENTS 5,022,557 A    6/1991   Turner
5,086,806 A    2/1992   Engler et al.
(Continued)

FOREIGN PATENT DOCUMENTS

EP    1148800 A2    10/2001
EP    1759617 A1    3/2007
(Continued)

OTHER PUBLICATIONS

"Flow measurement—Wikipedia", May 2, 2019 (May 2, 2019), XP055806230, Retrieved from the Internet: URL:https://web.archive.org/web/201 90502212410/https://en.wikipedia.org/wiki/Flow_measurement [retrieved on May 20, 2021].
(Continued)

*Primary Examiner* — Jimmy Chou
(74) *Attorney, Agent, or Firm* — Suiter Swantz pc llo

(57) ABSTRACT

A beverage maker device is disclosed. In embodiments, the device includes an external housing and a water tank coupled to a water supply via an inlet. The beverage maker includes a manifold within the housing, the manifold controlling the dispensing of the water into a server or through a faucet via solenoid valves. The beverage maker includes a pressure transducer coupled to the inlet and capable of sensing a flow pressure of the water through the inlet, sending a pressure signal to the beverage maker control circuitry based on the determined flow pressure. The control circuitry receives the pressure signal and determines a flow volume of the water through the inlet based on the flow pressure; if the flow volume reaches a flow threshold, the control circuitry cuts off the flow of water via the solenoid valves.

10 Claims, 11 Drawing Sheets

(58) Field of Classification Search
USPC .................................. 99/279, 280, 283, 295
See application file for complete search history.

(56) References Cited

U.S. PATENT DOCUMENTS

| | | | | |
|---|---|---|---|---|
| 6,142,063 | A * | 11/2000 | Beaulieu | A47J 31/3623 99/302 R |
| 6,526,872 | B2 * | 3/2003 | Wong | A47J 31/053 99/282 |
| 7,644,650 | B2 * | 1/2010 | Suzuki | A47J 31/469 99/280 |
| 2002/0152895 | A1 * | 10/2002 | Duffy | A47J 31/32 99/279 |
| 2003/0126993 | A1 * | 7/2003 | Lassota | A47J 31/402 99/279 |
| 2005/0126401 | A1 * | 6/2005 | Streeter | A47J 31/56 99/279 |
| 2005/0183578 | A1 * | 8/2005 | Mandralis | A47J 31/0668 99/279 |
| 2006/0011068 | A1 * | 1/2006 | Spencer | A47J 31/5251 99/307 |
| 2006/0011069 | A1 * | 1/2006 | Spencer | A47J 31/545 99/307 |
| 2009/0095165 | A1 * | 4/2009 | Nosier | A47J 31/20 99/289 R |
| 2009/0136639 | A1 * | 5/2009 | Doglioni Majer | A47J 31/36 99/302 R |
| 2011/0061542 | A1 | 3/2011 | Jimenez et al. | |
| 2011/0094389 | A1 * | 4/2011 | Coccia | A47J 31/36 99/280 |
| 2011/0097454 | A1 * | 4/2011 | Coccia | A47J 31/54 99/283 |
| 2012/0328748 | A1 * | 12/2012 | Doglioni Majer | A47J 31/5255 426/231 |
| 2013/0062322 | A1 * | 3/2013 | Griffin | H05H 1/34 219/121.51 |
| 2013/0089649 | A1 * | 4/2013 | Feilner | C12C 7/14 426/475 |
| 2014/0069279 | A1 * | 3/2014 | Upston | A47J 31/4403 99/283 |
| 2014/0263397 | A1 * | 9/2014 | Jacobs | A47J 31/5251 222/1 |
| 2015/0013546 | A1 | 1/2015 | Kastor | |
| 2015/0201796 | A1 * | 7/2015 | Kuempel | H04L 67/10 426/231 |
| 2015/0216355 | A1 * | 8/2015 | Duvall | A47J 31/30 99/282 |
| 2015/0230655 | A1 * | 8/2015 | Hoog | A47J 31/0576 99/283 |
| 2015/0351580 | A1 * | 12/2015 | Ferraro | A47J 31/3671 426/431 |
| 2016/0109165 | A1 * | 4/2016 | Mackey | F28D 1/06 426/524 |
| 2016/0150911 | A1 * | 6/2016 | Upston | A47J 31/462 99/285 |
| 2016/0235244 | A1 * | 8/2016 | Bezzera | A47J 31/52 |
| 2019/0125123 | A1 * | 5/2019 | Startz | A47J 31/52 |
| 2019/0331516 | A1 * | 10/2019 | Freymiller | A23G 9/281 |
| 2020/0352390 | A1 * | 11/2020 | Ceotto | A47J 31/52 |
| 2020/0367689 | A1 * | 11/2020 | Illy | A47J 31/5253 |

FOREIGN PATENT DOCUMENTS

| | | |
|---|---|---|
| EP | 3430951 A1 | 1/2019 |
| JP | 3796066 B2 | 7/2006 |

OTHER PUBLICATIONS

Extended Search Report for European Application No. 21155860.6 dated Jun. 8, 2021, 10 pages.

* cited by examiner

PRESSURE SENSOR OVERFLOW INTERLOCK SYSTEM FOR BEVERAGE MAKER

CROSS-REFERENCE TO RELATED APPLICATIONS

This application claims priority under 35 U.S.C. §§ 119 and/or 120 to the following U.S. patent applications: U.S. patent application Ser. No. 16/433,207 entitled BEVERAGE MAKER PLATEN OVERFLOW SENSING SYSTEM and filed Jun. 6, 2019.

This application is related to concurrently filed U.S. patent application Ser. No. 16/784,922 entitled DIFFERENTIAL PRESSURE FLOW METER FOR BEVERAGE MAKER.

Said U.S. patent applications Ser. No. 16/433,207 and 16/784,922 are herein incorporated by reference in their entirety.

BACKGROUND

Aircraft beverage maker devices can brew coffee or tea or provide hot water via an exterior faucet. Said devices are connected to an aircraft potable water supply and may be at risk of overflow, e.g., due to software or electrical sensor malfunctions. For example, software or sensor failures may cause the solenoids controlling the dispensation of water to remain open indefinitely, leading to overflow of the platen drain system.

SUMMARY

A beverage maker device is disclosed. In embodiments, the beverage maker device includes an external housing installable in an aircraft galley. The housing includes a water tank (e.g., hot water tank) fed by an inlet coupled to an aircraft water supply. The device includes a manifold within the housing for controlling the dispensing of water via one or more solenoid valves (e.g., for hot water or coffee/tea brewing). The device includes a pressure transducer plumbed in the inlet and capable of transmitting a signal corresponding to the water pressure within the inlet. The device includes a process control board (PCB) within the housing and including control processors as well as control circuitry in communication with the solenoid valves. The control circuitry receives the pressure signal and thereby determines a flow volume of the water through the inlet. If the flow volume reaches a predetermined threshold (e.g., the interior volume of a server), the control circuitry directs the solenoid valves to cease dispensing of water through the outlet.

A beverage maker device is also disclosed. In embodiments, the beverage maker device includes an external housing installable in an aircraft galley or galley structure. The housing includes a water tank (e.g., hot water tank) fed by an inlet coupled to an aircraft water supply. The device includes a manifold within the housing for controlling the dispensing of water via one or more solenoid valves (e.g., for hot water or coffee/tea brewing). The device includes an inlet body connected to the tank and to the inlet coupling (e.g., connecting the inlet to the aircraft water supply). Within the inlet body are plumbed two pressure transducers, on either side (e.g., tank-side and coupling-side) of a restriction orifice. The tank-side and coupling-side pressure transducers sense flow pressure on their respective sides of the restriction orifice and generate tank-side and coupling-side flow pressure signals. Within the housing a process control board (PCB) includes control processors and control circuitry in communication with the solenoid valves. The PCB control processors determine the differential pressure associated with the water flow based on the received tank-side and coupling-side pressure signals.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION

Figure 1:
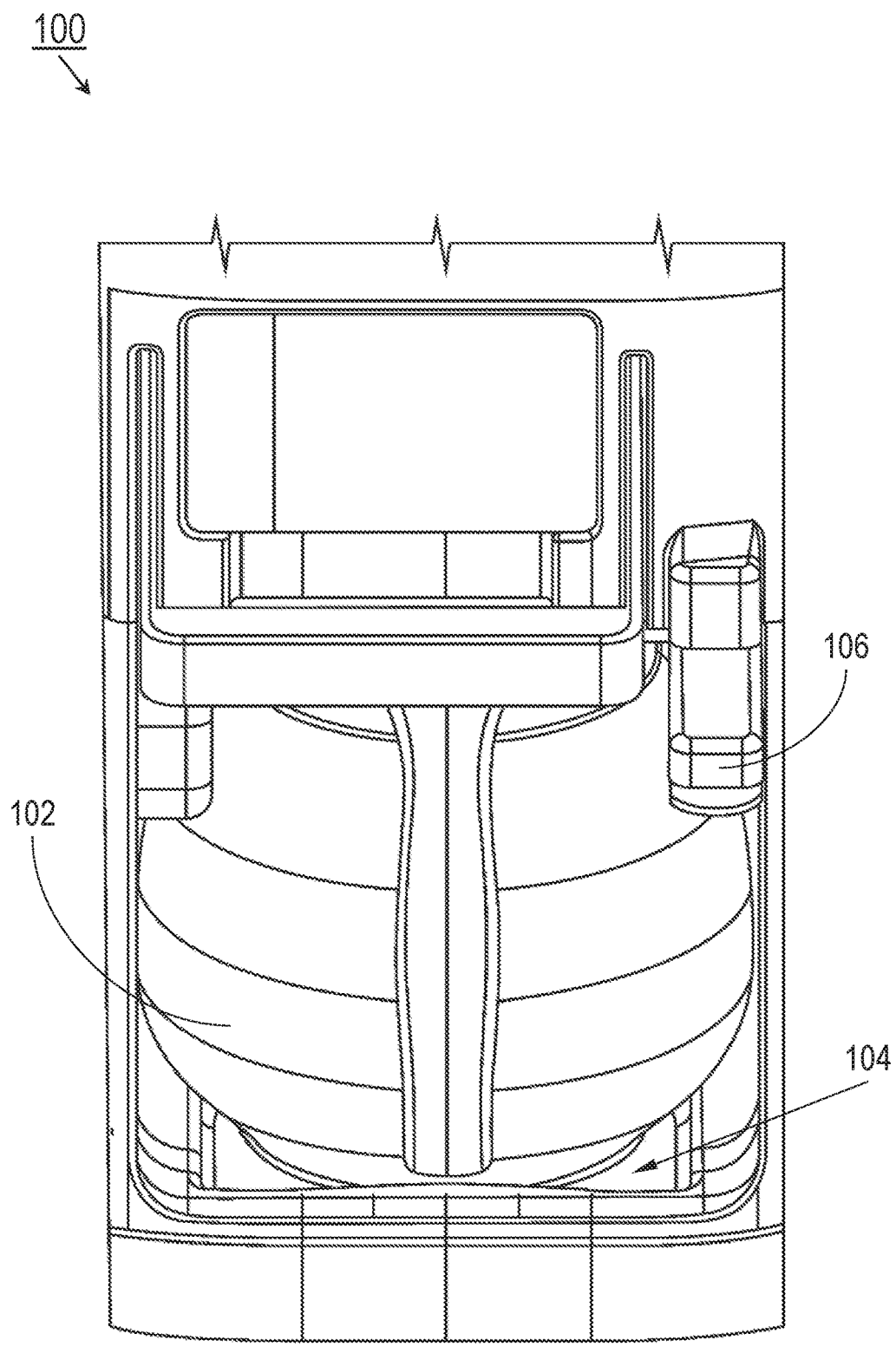
FIG. 1 is a forward view of a beverage maker device according to example embodiments of this disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Broadly speaking, embodiments of the inventive concepts disclosed herein are directed to overflow mitigation and flow monitoring systems for a beverage maker device (e.g., a device installable in an aircraft galley for brewing or dispensing coffee, tea, and/or hot water). The overflow mitigation system monitors flow pressure through the device and can prevent overflow at any angle by tracking the flow volume based on flow pressure, preventing overflow even in the event of software or sensor failure.

FIGS. 1 and 2A Through 2C—Beverage Maker Generally

Referring to FIG. 1, a beverage maker device 100 is disclosed. The beverage maker device 100 may include a server 102 insertable in a platen 104 and an external faucet 106.

In embodiments, the beverage maker device 100 may be installable in a standard-size galley insert (GAIN) niche of an aircraft galley structure or monument, connectible to an onboard water supply, power supply, and aircraft network via a GAIN interface (not shown). For example, the beverage maker device 100 may receive operating power and potable water, or provide the aircraft network with usage and diagnostic data. Hot water may be dispensed into the server 102, e.g., for brewing tea or coffee, or dispensed directly into a cup or other container via the external faucet 106.

Figure 2A:
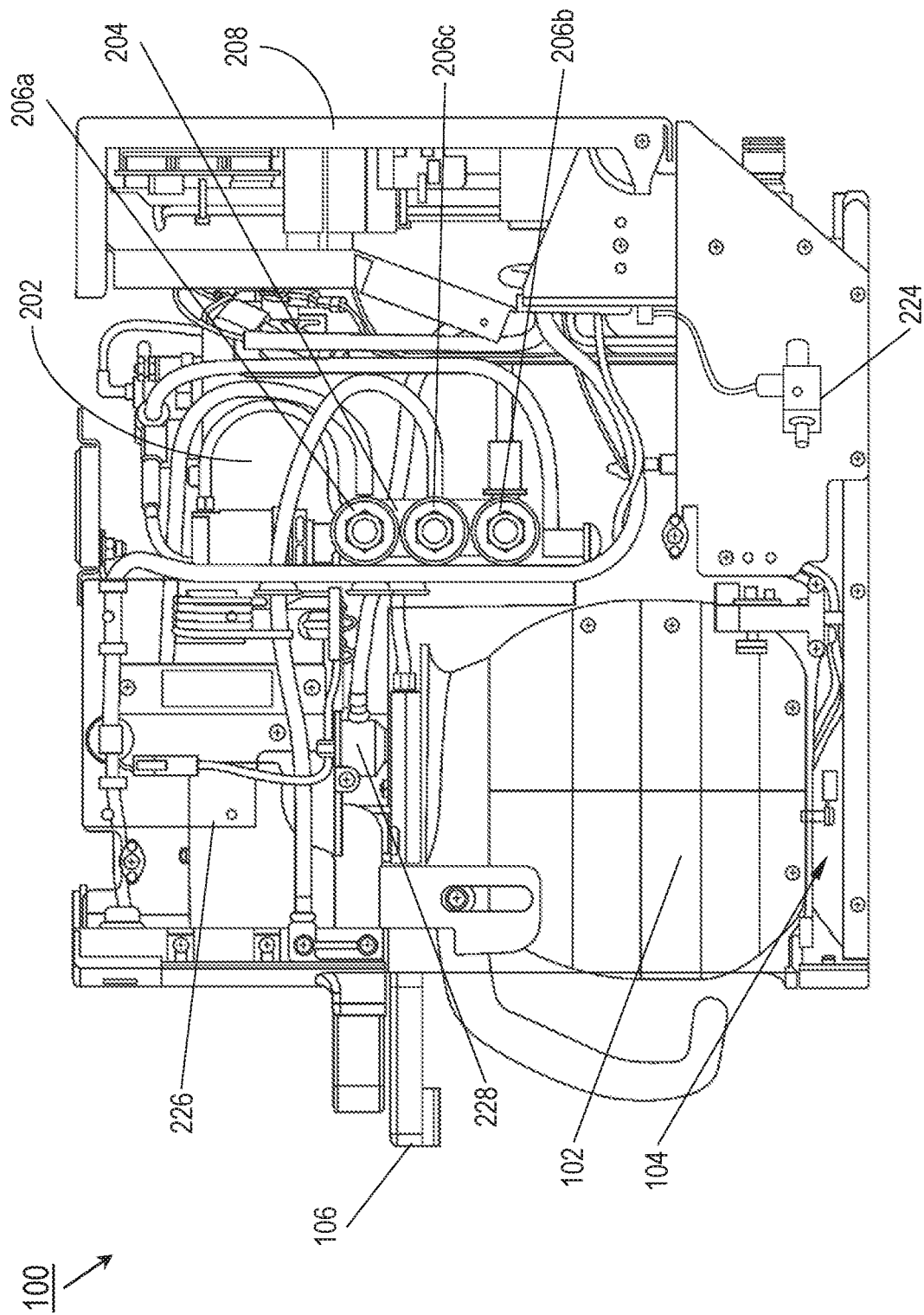
FIG. 2A is a partial cutaway view of the beverage maker device of FIG. 1.
Figure 2B:
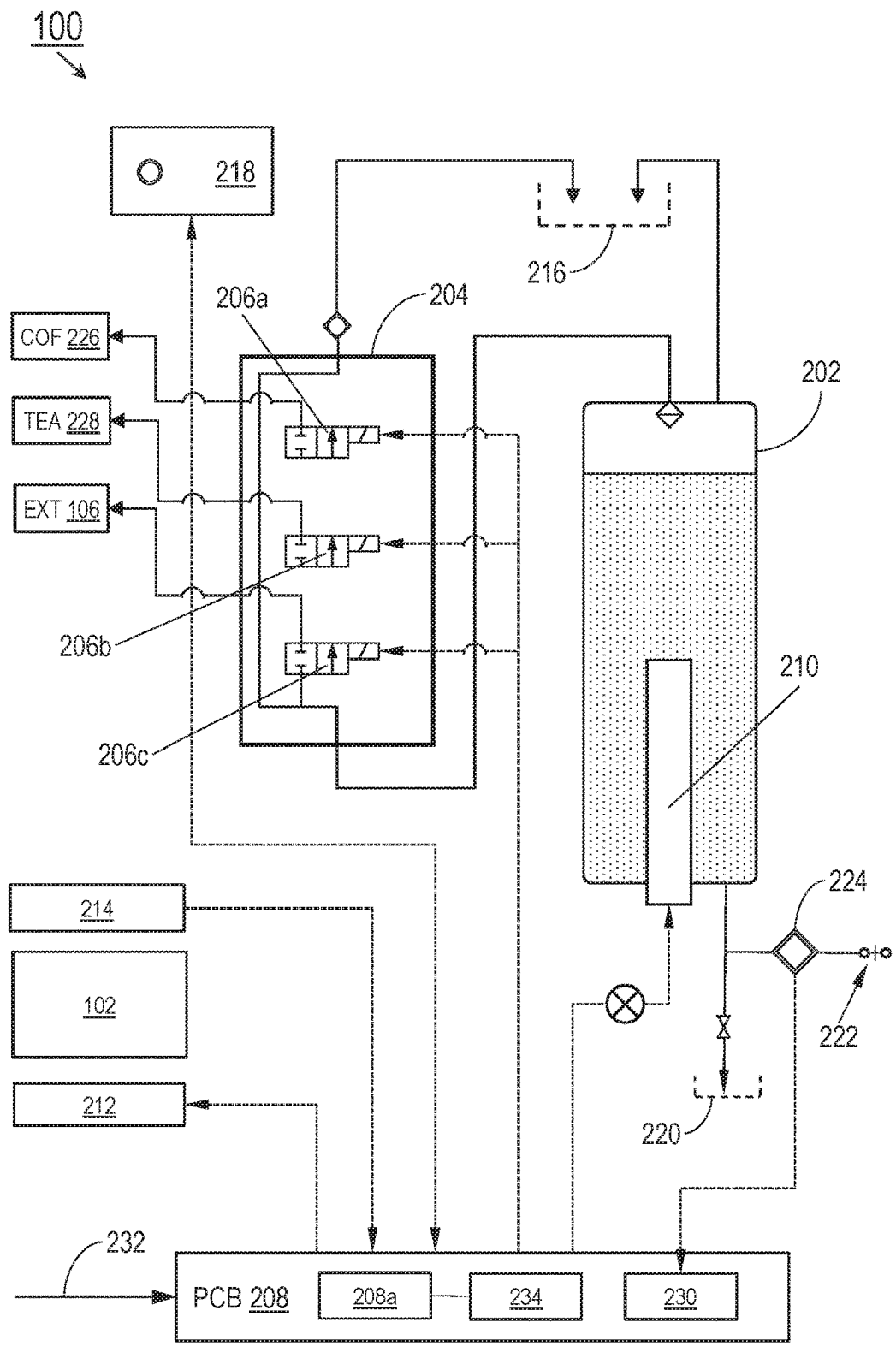
FIGS. 2B and 2C are diagrammatic illustrations of the beverage maker device of FIG. 1.
Figure 2C:
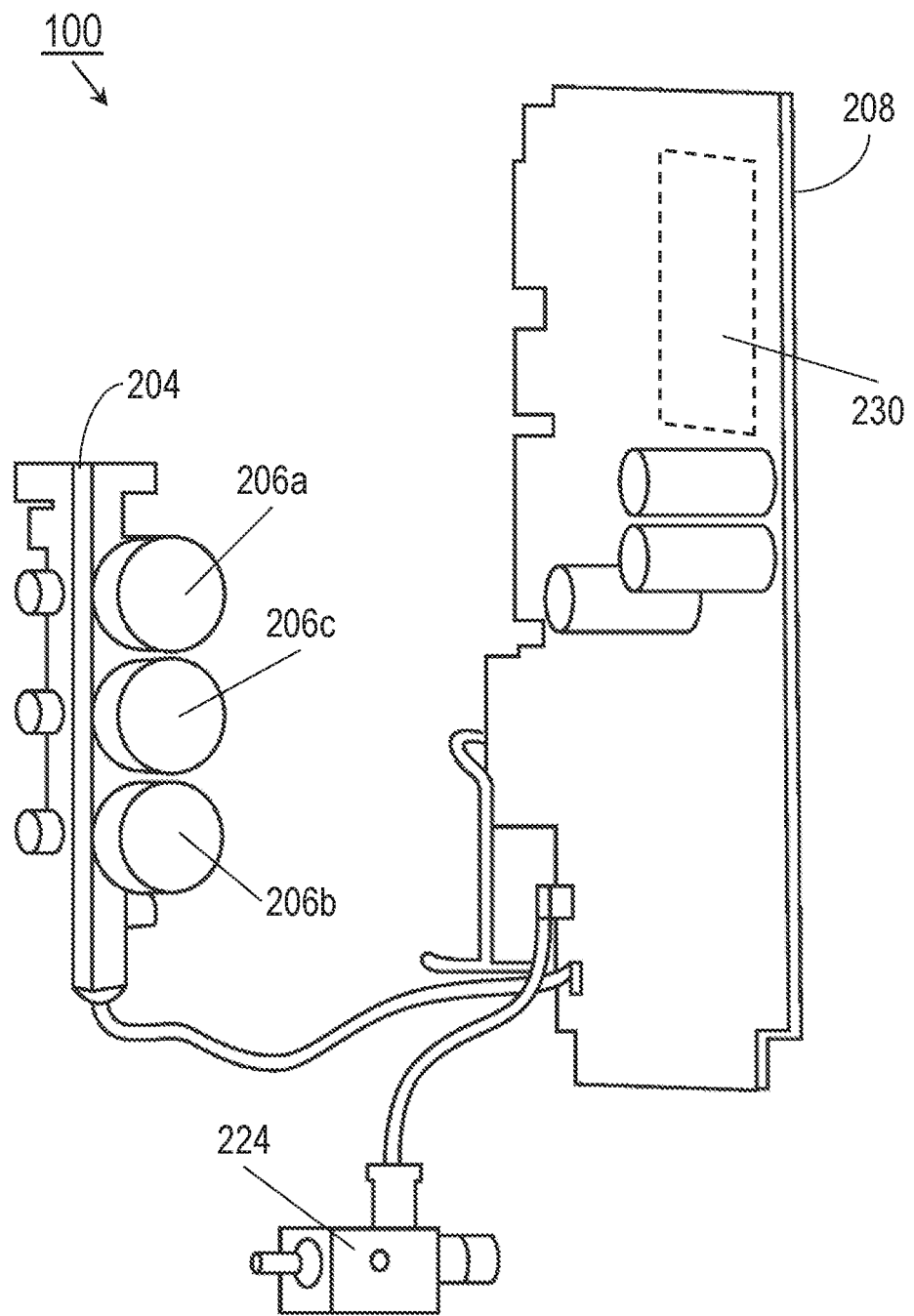

Referring also to FIGS. 2A through 2C, the beverage maker device 100 may include a hot water tank 202, a manifold 204, solenoid valves 206a-c, a process control board 208 (PCB), tank heaters 210, a platen heater 212, a server level sensor 214, a platen drain 216, a human/machine interface 218 (HMI), an external drain 220, an inlet body 222, and a pressure transducer 224.

The hot water tank 202 may be plumbed to the manifold 204 for dispensing hot water from the hot water tank, e.g., for the brewing of coffee (via brew head 226) to an external brew cup (via the solenoid valve 206a), for the brewing of tea (via tea tube funnel 228 and the solenoid valve 206b), or for the dispensing of hot water through the external faucet 106 (via the solenoid valve 206c). Water dispensed by the beverage maker device 100 may be heated by tank heaters 210 within the hot water tank 202 and kept warm by the platen heater 212 within the platen 104 (e.g., directly underneath and in contact with the server 102 when the server is present). The hot water tank 202 may include an external drain 220; further, the platen 104 may be plumbed to the platen drain 216, allowing any spillage within the platen to flow to an aircraft wastewater system.

In embodiments, the PCB 208 may house an overflow mitigation circuit 230 connecting the pressure transducer 224 to the solenoid valves 206a-b on the manifold 204. The PCB 208 may be supplied with input power (232) from an aircraft-based power system (e.g., via a galley insert (GAIN) interface by which the beverage maker device 100 is connected to aircraft power supplies and networks). The PCB 208 may additionally house onboard control processors 208a and memory 234 capable of storing encoded instructions executable by the control processors as well as the overflow mitigation circuit 230 and other control circuitry on the PCB.

In embodiments, the pressure transducer 224 may sense the pressure of the flow of water through the inlet body 222 into the hot water tank 202, enabling the overflow mitigation circuit 230 to allow no more than a predetermined volume of water to be dispensed (e.g., into the server 102). For example, the sensed pressure data may be in the form of a signal to the overflow mitigation circuit 230 on the PCB 208. Based on the received pressure data, the overflow mitigation circuit 230 may determine if the volume of water dispensed (e.g., during a given catering cycle of the beverage maker device 100) has reached the predetermined threshold. For example, the flow threshold may be set to 1.5 liters, or the internal volume of the server 102, to prevent overflow. In some embodiments, the flow threshold may be reduced or otherwise adjusted by the control processors 208a, either manually (e.g., based on control input submitted by an operator via the HMI 218) or automatically, e.g., when the aircraft-based water supply feeding the inlet body 222 and the hot water tank 202 is experiencing low water levels.

In embodiments, if the overflow mitigation circuit 230 indicates that the predetermined volume threshold is reached while the beverage maker device 100 is still dispensing, the overflow mitigation circuit 230 may close the corresponding solenoid valve 206a-b, preventing further dispensation of hot water until the next catering cycle.

FIGS. 3A-D: Overflow Mitigation Circuit Detail

Referring to FIGS. 3A through 3D, the overflow mitigation circuit 230 is shown.

In embodiments, the overflow mitigation circuit 230 may utilize signals from sensors within the beverage maker device (100, FIGS. 1-2C) as well as the pressure signal generated by the pressure transducer 224 to limit the volume of hot water dispensed by the beverage maker device to a predetermined threshold (e.g., 1.5 L, or the interior volume of the server (102, FIG. 1)) during a given catering cycle. For example, the overflow mitigation circuit 230 may allow cabin crew to utilize the beverage maker device 100 accounting for interruptions during the catering cycle. In some embodiments, the overflow mitigation circuit 230 may provide for low water level protection in the event of a shortage or fluctuation within an aircraft-based potable water supply.

Figure 3A:
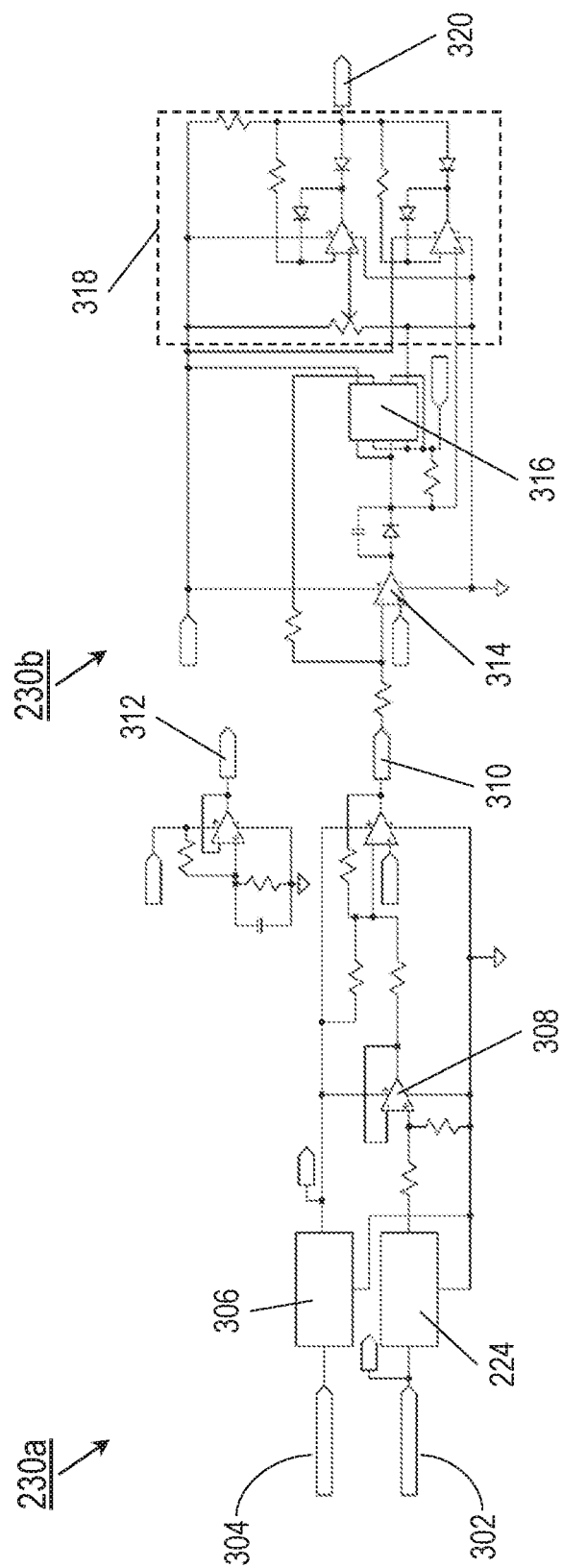
FIGS. 3A through 3D are schematic diagrams of an overflow mitigation circuit of the beverage maker device of FIG. 1.

In embodiments, referring in particular to FIG. 3A, first and second stages 230a-b of the overflow mitigation circuit 230 may access a +5V power supply (302) to power digital electronics and the pressure transducer 224 and a +24V power supply (304) to power analog electronics (e.g., via a +18V linear regulator 306). For example, the voltage output of the pressure transducer 224 may be divided into a usable range, buffered (e.g., via amplifier 308), level shifted and inverted to generate a pressure voltage 310 corresponding to the flow pressure into the hot water tank (202, FIG. 2B) as well as a virtual ground reference 312 at half the supply voltage. The pressure voltage 310 may be further processed (e.g., via amplifier 314 and analog multiplier 316) and set through a precision limiter 318 that allows voltages below a threshold voltage to pass but maintains the output voltage 320 at the threshold voltage once the threshold voltage is reached.

Figure 3B:
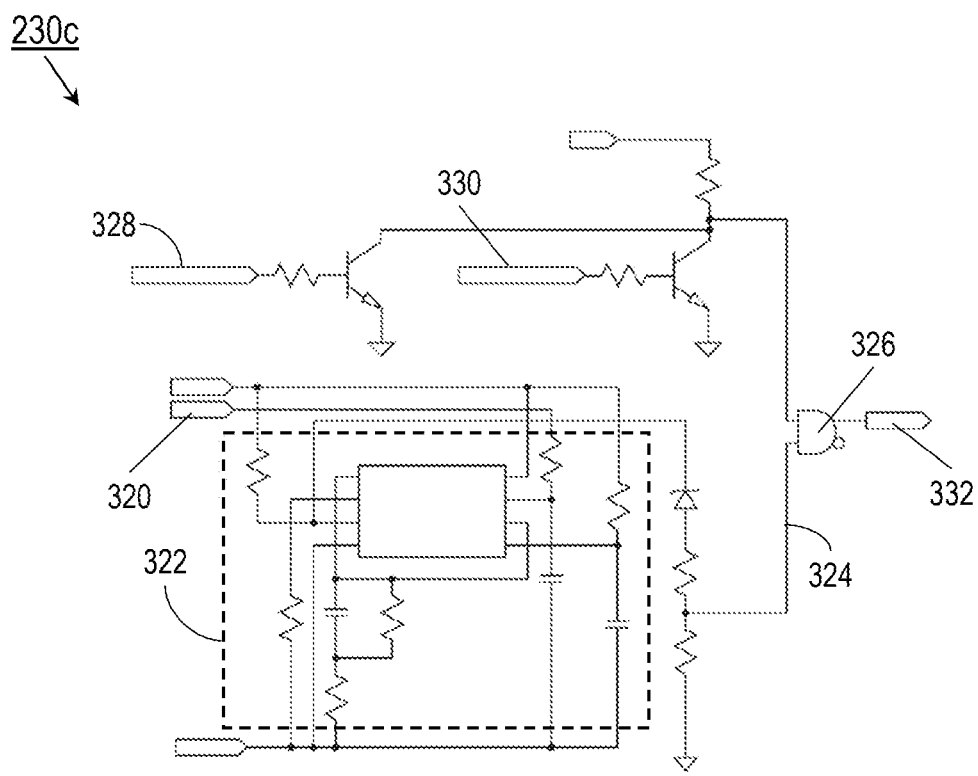

Referring also to FIG. 3B, a third stage 230c of the overflow mitigation circuit 230 is shown. In embodiments, within the third stage 230c the output voltage 320 is directly proportional to the velocity of the water flow, and may be utilized by the overflow mitigation circuit 230 as a control voltage to run a highly linear voltage-controlled oscillator 322 (VCO). The voltage output of the VCO 322 may be further processed into a complementary metal oxide semiconductor (CMOS) compatible signal 324. At AND gate 326, the CMOS compatible signal 324 may be gated by either a count-inhibit signal 328 or a dispense-limit signal 330 if either is active (resulting in CMOS-compatible output signal 332).

Figure 3C:
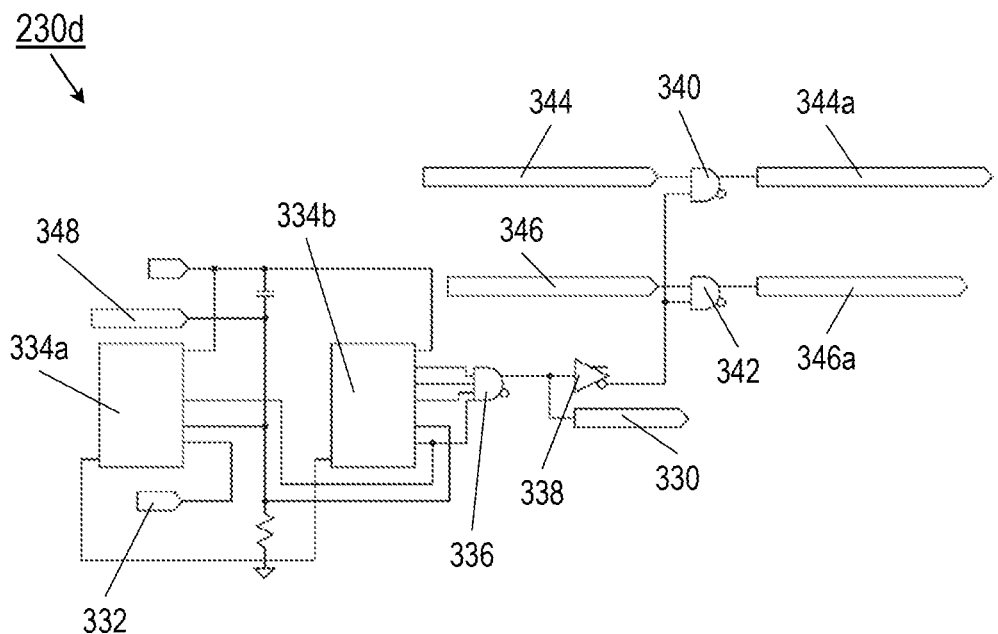

Referring also to FIG. 3C, a fourth stage 230d of the overflow mitigation circuit 230 is shown. In embodiments, within the fourth stage 230d the CMOS-compatible output signal 332 may be sent to cascaded counters 334a-b, which determine how many signal cycles of the VCO 322 constitute an allowable volume of water to dispense before activating gates 336, 338, which cease the dispensing of water by deactivating the signals to the solenoid valves (206a-b, FIG. 2A-C) controlling the water flow. For example, when the flow threshold is reached (as determined by the inputs to the gate 336) the output of the gate 336 is HIGH (e.g., dispense-limit signal 330) and the output of the gate 338 is LOW, feeding the gates 340, 342 (e.g., via respective coffee and tea solenoid input signals 344, 346) and deactivating the coffee solenoid output signal (344a; e.g., to solenoid valve 206a) and tea solenoid output signal (346a; e.g., to solenoid valve 206b).

Figure 3D:
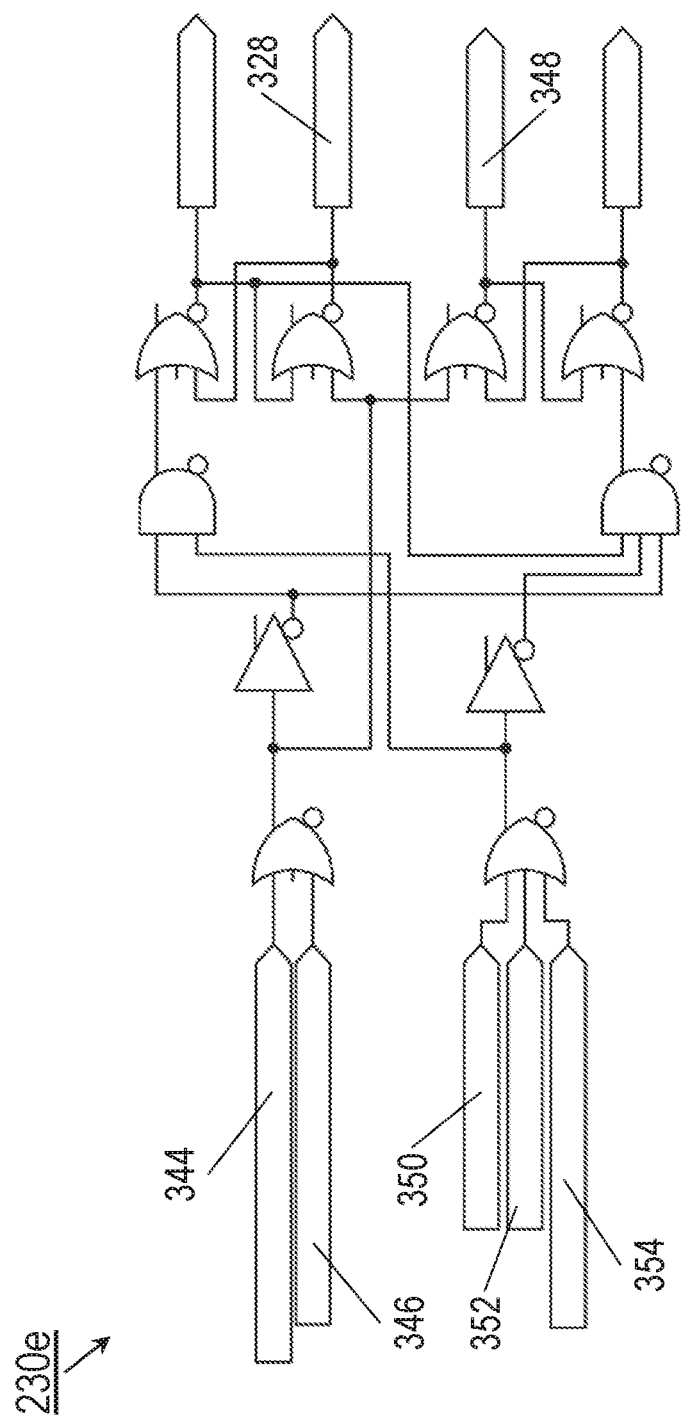

Referring also to FIG. 3D, a fifth and final stage 230e of the overflow mitigation circuit 230 is shown. In embodiments, within the fifth stage 230e digital components of the overflow mitigation circuit 230 may determine whether to activate the count-inhibit signal 328 and low-true count-reset signal 348. For example, the count-inhibit signal 328 may account for routine interruptions in service (based on, e.g., a handle-up signal 350, a low-water signal 352, and a pushbutton-in signal 354 (associated with the external faucet (106, FIG. 1))) that may require pausing the signal count by the cascaded counters 334a-b. Similarly, the count-reset signal 348 may be used when the beverage maker device 100 completes a catering cycle (e.g., brews a full pot of coffee or tea) to reset the counter values in the cascaded counters 334a-b for subsequent catering functions.

Figure 4A:
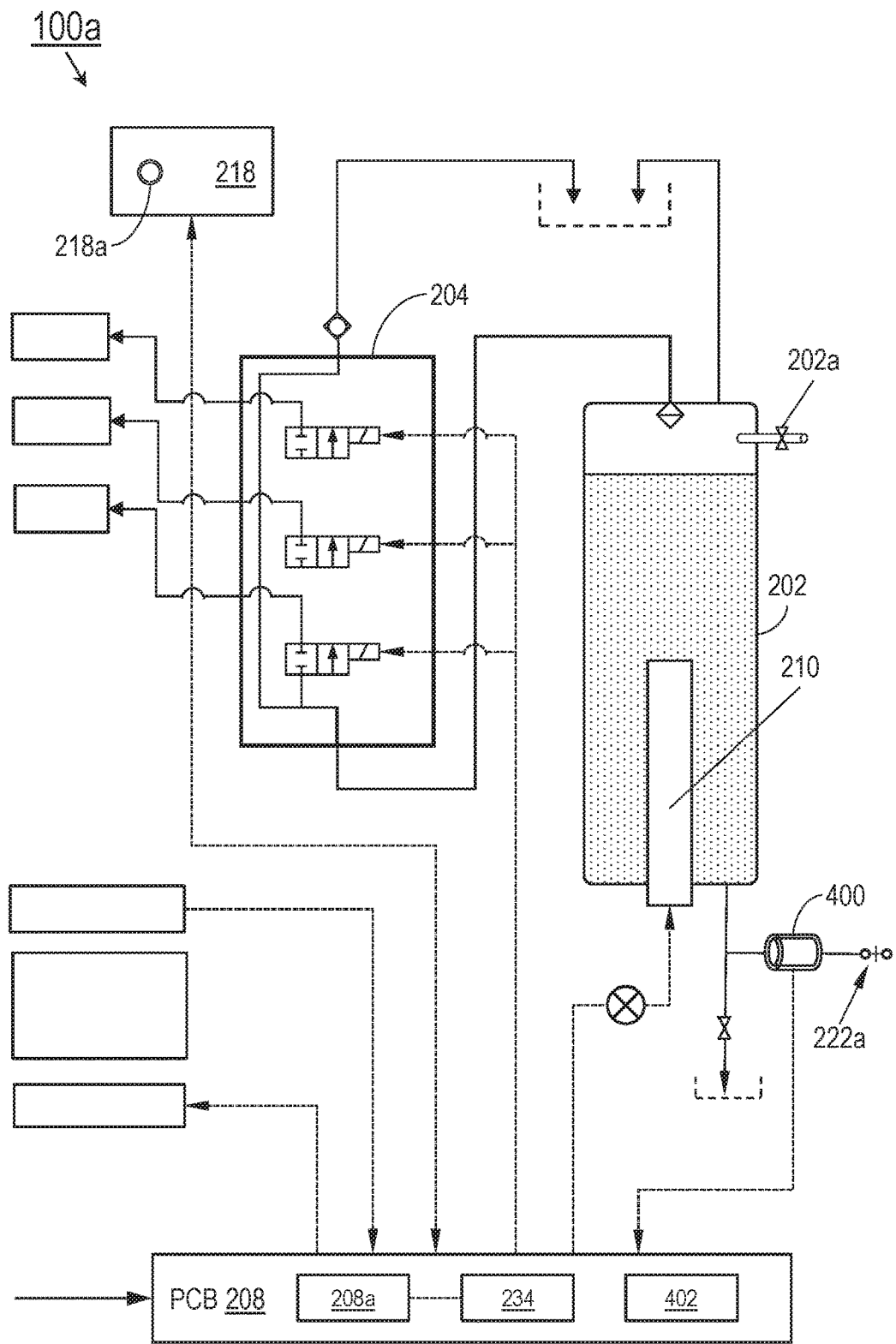
FIG. 4A is a diagrammatic illustration of a beverage maker device according to example embodiments of this disclosure.

FIGS. 4A/B—Differential Pressure Flow Meter

Referring to FIG. 4A, the beverage maker device 100a may be implemented and may function similarly to the beverage maker device 100 of FIGS. 1 through 3D, except that the beverage maker device 100a may incorporate a differential-pressure flow meter 400 plumbed into the water supply inlet and compatible with software stored to memory 234 and executed by the control processors 208a to signal the control circuitry 402 of the PCB 208.

Changes in water demand throughout an aircraft-based water system may, for example, lower water system pressure to such an extent that beverage maker devices, if the system pressure drops below their designed minimum operating pressure, may drain back into the water supply and enter a low-water protection mode. In embodiments, the differential-pressure flow meter 400 may sense the water pressure supplied to it as well as the flow of water entering and leaving the beverage maker device 100a.

Figure 4B:
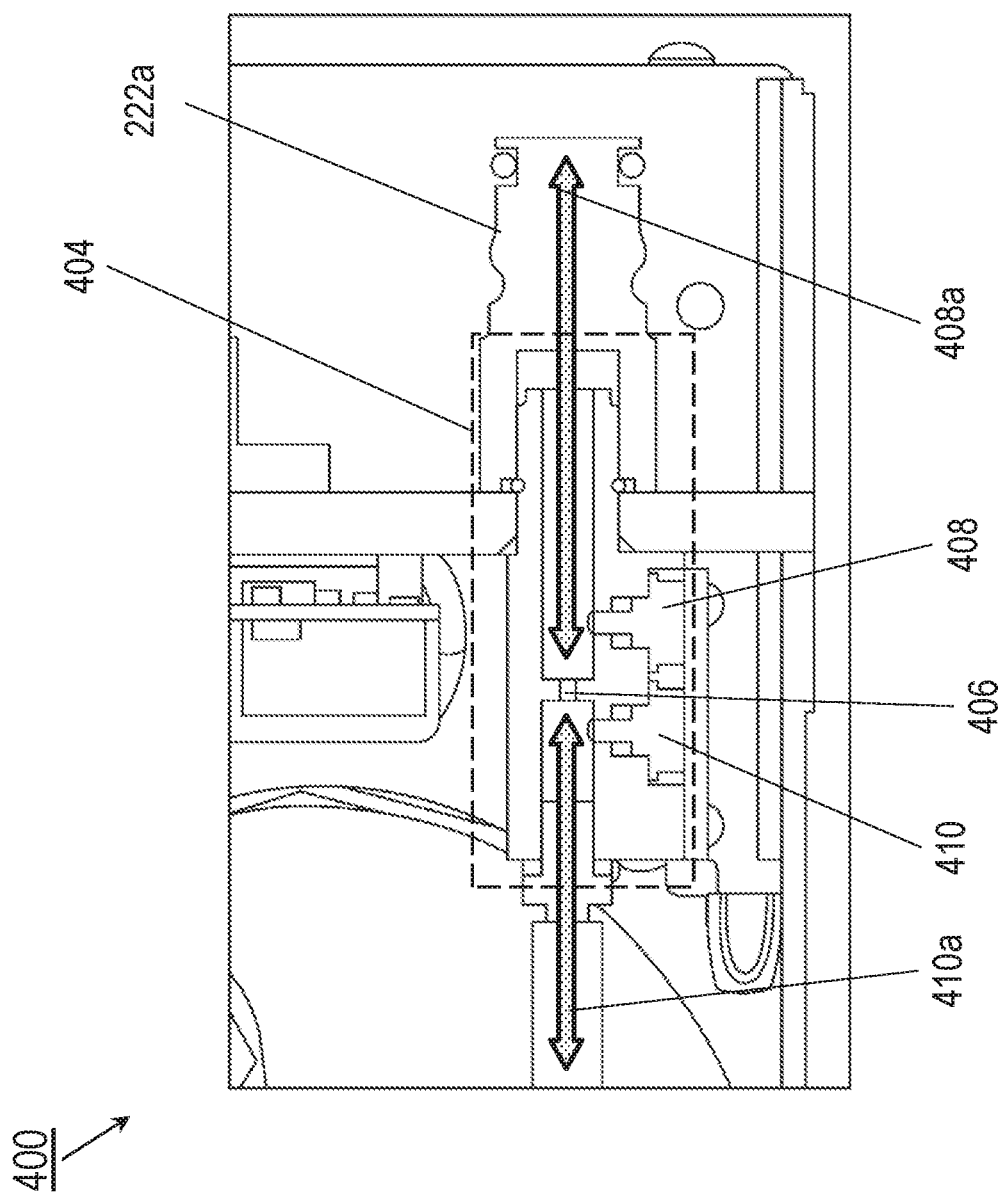
FIG. 4B is a partial cross-sectional view of a differential-pressure flow meter of the beverage maker device of FIG. 4A.

In embodiments, referring also to FIG. 4B, the differential-pressure flow meter 400 may include an inlet body 404 plumbed between the water tank 202 and the inlet coupling 222a to the water supply. Within the inlet body 404, a restriction orifice 406 restricts the water flow to a predetermined diameter (e.g., 0.062 inch). On either side of the restriction orifice 406, a coupling-side pressure transducer 408 and a tank-side pressure transducer 410 sense, respectively, the supply flow pressure 408a and the tank-side flow pressure 410a as water flows into the beverage maker device. Based on the pressure drop between the supply flow pressure 408a and tank-side flow pressure 410a, or more generally the pressure differential between the supply flow pressure and tank-side flow pressure, the PCB 208 may determine a water flow rate.

By way of a non-limiting example, for respective inlet and outlet densities $\rho_1$ and $\rho_2$, restriction orifice diameter d, inlet diameter D, high pressure side $P_1$ (e.g., the higher of the supply flow pressure 408a and tank-side flow pressure 410a) and low pressure side $P_2$, a flow rate $Q_M$ may be determined via Bernoulli's equation $$Q_M = \left(\sqrt{\frac{1}{\left(\frac{\rho_1}{\rho_2}\right)-\beta^4}}\right)\left(\frac{\pi}{4}\right)(d^2)\left(\sqrt{2(P_1-P_2)(\rho_1)}\right)$$

$$\text{where } \beta = \frac{d}{D}.$$

Figure 5:
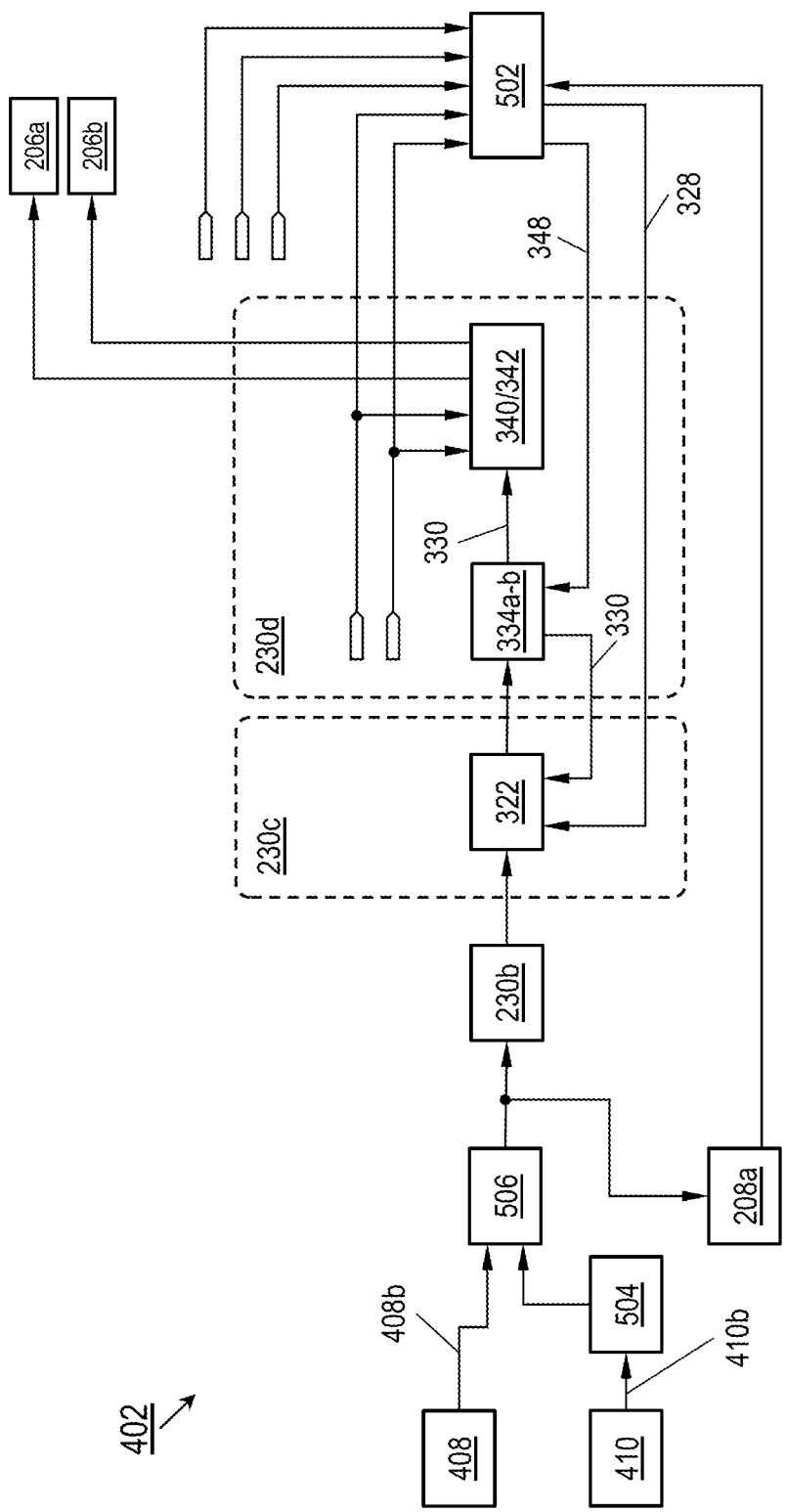
FIG. 5 is a diagrammatic illustration of the differential-pressure flow meter and control circuitry of the beverage maker device of FIG. 4A.

FIG. 5—Dual Pressure Control Circuitry

Referring to FIG. 5, the control circuitry 402 is shown. The control circuitry 402 may include count inhibit/reset logic 502, count-inhibit signal 328, dispense-limit signal 330, and low-true count-reset signal 348.

In embodiments, the control circuitry 402 may be implemented and may operate similarly to the overflow mitigation circuit 230 (incorporating stages 230b-d) of FIGS. 2B through 3D, except that the control circuitry 402 may receive input signals 408b, 410b from the pressure transducers 408, 410 (e.g., indicating, respectively, the supply flow pressure (408a, FIG. 4B) and the tank-side flow pressure (410a, FIG. 4B)). For example, one of the input signals 410b may be inverted (504) before further processing (506; e.g., summing, scaling) with the other input signal 408b. The control processors 208a of the PCB (208, FIG. 4A) may determine a flow rate based on the processed input signals and signal the control circuitry (e.g., to disable the solenoids (206a-b, FIG. 4A) (e.g., via gates 340, 342) if the flow volume exceeds the flow threshold.

Figure 6:
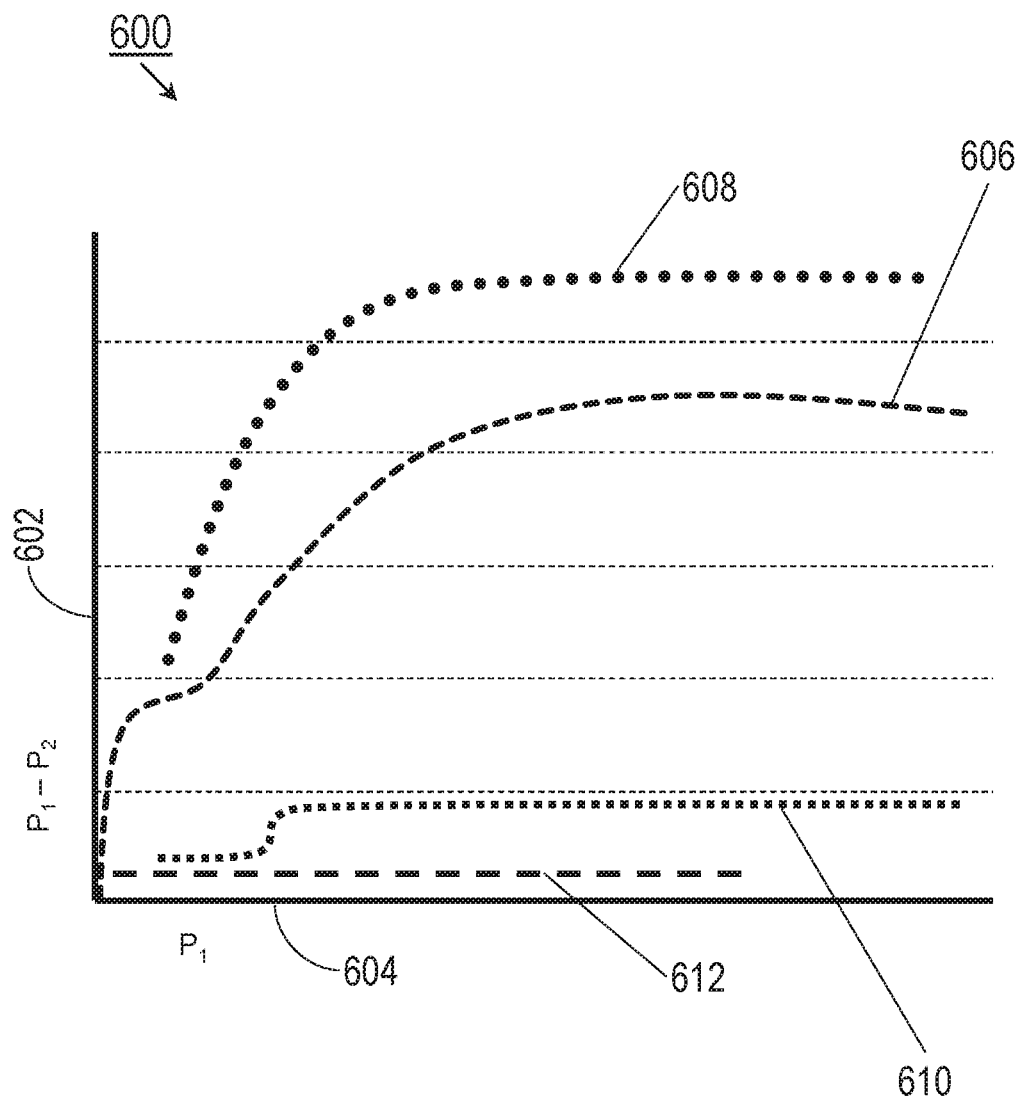
FIG. 6 is a two-dimensional plot of operations of the differential-pressure flow meter of FIG. 4B.

FIG. 6—Flow Relationships

Referring also to FIG. 6, the PCB 208 may (e.g., additionally multiplying by a discharge coefficient to account for geometry losses) track flow pressure and flow rate over time, plotting performance relationships of flow pressure vs. flow rate during each individual catering cycle.

In embodiments, the plot (600) of differential pressure 602 (e.g., $P_1$-$P_2$) versus high pressure 604 (e.g., $P_1$) may identify deviations in flow performance due to, e.g., scale buildup or variation in flow control washers. Based on identified deviations, the PCB (208, FIG. 4A) may alert cabin crew. For example, the plot 600 may identify nominal flow conditions (606) as well as, e.g., high flow alerts 608, low flow alerts 610, or a leakage condition 612 (e.g., if flow is detected into the beverage maker device (100a, FIG. 4A) when water is not being dispensed) resulting in negligible or zero tank-side flow pressure (410a, FIG. 4B). Similarly, the differential-pressure flow meter (400, FIG. 4A/B) may track water flowing from the hot water tank (202, FIG. 4A) back to the potable water supply due to pressure loss (e.g., where water flows through the restriction orifice (406, FIG. 4B) from left to right, as shown by FIG. 4B, and the coupling-side flow pressure (408a, FIG. 4B) is lower than the tank-side flow pressure 410a). Additionally, the differential-pressure flow meter 400, may determine whether the hot water tank (202, FIG. 4A) is filled with water before initiating a heating cycle (e.g., via the tank heaters 210, FIG. 4A). For example, air venting from the hot water tank 202 during system fill (e.g., via a venting valve (202a, FIG. 4A)) may greatly increase differential pressure 602 due to the lack of backpressure. In some embodiments, alert conditions detected by the PCB 208 may be reported to cabin crew and/or other users of the beverage maker device 100a, e.g., via visual alert lights (218a, FIG. 4A) or indicators incorporated into the HMI (218, FIG. 4A), or via alert messages sent to aircraft networks, e.g., to aircraft-wide system monitors. In some embodiments, based on the determined differential pressure, the PCB 208 may activate the venting valve 202a to release excess air from the water tank 202.

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

We claim:

1. A beverage maker device, comprising:
a housing installable in an aircraft galley;
a tank configured to hold a volume of a fluid, the tank coupled to a fluid supply via an inlet;
a manifold disposed within the housing and including one or more solenoid valves configured to control dispensing of the fluid from the tank through an outlet;
at least one pressure transducer operatively coupled to the inlet, the pressure transducer configured to transmit at least one pressure signal corresponding to a pressure of the fluid through the inlet;
and
a process control board (PCB) disposed within the housing, the PCB comprising:
at least one control processor;
and
control circuitry communicatively coupled to the one or more solenoid valves and to the pressure transducer, the control circuitry configured to:
receive the at least one pressure signal;
based on the received pressure signal, determine a flow volume of the fluid through the inlet;
and
if the determined flow volume reaches or exceeds a flow threshold, direct the one or more solenoid valves to cease the dispensing of the fluid.

2. The beverage maker device of claim 1, further comprising:
a server insertable in the housing, the outlet capable of dispensing the fluid into the server;
wherein
the flow threshold corresponds to an interior volume of the server.

3. The beverage maker device of claim 1, wherein the outlet includes an external faucet attached to the housing and coupled to the tank, the external faucet capable of dispensing the fluid.

4. The beverage maker device of claim 1, further comprising:
at least one memory in communication with the PCB, the memory capable of storing encoded instructions associated with the solenoid valves, the encoded instructions executable by the control processor.

5. The beverage maker device of claim 1, wherein the control processor is configured to adjust the flow threshold.

6. The beverage maker device of claim 1, further comprising:
at least one warning indicator in communication with the control circuitry;
wherein the control circuitry is configured to:
generate at least one alert signal corresponding to the determined differential pressure;
and
transmit the alert signal to the warning indicator;
wherein the warning indicator is configured to generate at least one visible alert in response to the alert signal.

7. The beverage maker device of claim 6, wherein the at least one warning indicator includes a warning light set into the housing.

8. The beverage maker device of claim 1, wherein the control circuitry is configured to generate at least one of:
a reset signal capable of resetting the flow volume;
or
an inhibit signal capable of pausing the flow volume.

9. The beverage maker device of claim 8, wherein the reset signal and the inhibit signal are associated with at least one triggering signal received by the control circuitry.

10. The beverage maker device of claim 9, wherein the triggering signal includes at least one of:
- a handle-up signal associated with the outlet;
- a pushbutton-in signal associated with the outlet; or
- a low-water signal.

* * * * *